US008266883B2

(12) United States Patent
Dion Ouellet et al.

(10) Patent No.: US 8,266,883 B2
(45) Date of Patent: Sep. 18, 2012

(54) POWER PLANT START-UP METHOD AND METHOD OF VENTING THE POWER PLANT

(75) Inventors: Noémie Dion Ouellet, Greenville, SC (US); Daniel David Snook, Greenville, SC (US); Lisa Anne Wichmann, Greenville, SC (US); Samuel David Draper, Greenville, SC (US); Scott Allen Rittenhouse, Columbus, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/217,646

(22) Filed: Aug. 25, 2011

(65) Prior Publication Data

US 2012/0023966 A1 Feb. 2, 2012

(51) Int. Cl.
*F02C 7/08* (2006.01)
*F02C 6/00* (2006.01)
*F02C 6/04* (2006.01)
*F02G 1/00* (2006.01)
*F02G 3/00* (2006.01)

(52) U.S. Cl. .............. 60/39.52; 60/39.182; 60/785

(58) Field of Classification Search ............ 60/39.52, 60/39.182, 782, 785
See application file for complete search history.

(56) References Cited

U.S. PATENT DOCUMENTS

| | | | |
|---|---|---|---|
| 2,621,475 A * | 12/1952 | Loy | .................. 60/774 |
| 2,646,663 A | 7/1953 | Sedille | |
| 3,685,287 A | 8/1972 | Dooley | |
| 3,866,411 A | 2/1975 | Marion et al. | |
| 3,949,548 A | 4/1976 | Lockwood, Jr. | |
| 4,267,692 A | 5/1981 | Earnest | |
| 4,271,664 A | 6/1981 | Earnest | |
| 4,313,300 A | 2/1982 | Wilkes et al. | |
| 4,330,038 A | 5/1982 | Soukup et al. | |
| 4,434,613 A * | 3/1984 | Stahl | ............... 60/784 |
| 4,492,085 A | 1/1985 | Stahl et al. | |
| 4,528,811 A | 7/1985 | Stahl | |

(Continued)

FOREIGN PATENT DOCUMENTS

EP 1731833 A1 12/2006

(Continued)

OTHER PUBLICATIONS

Disclosure under 37 CFR 1.56 for U.S. Appl. No. 13/217,646, filed Apr. 30, 2012.

(Continued)

*Primary Examiner* — William H Rodriguez
*Assistant Examiner* — Carlos A Rivera
(74) *Attorney, Agent, or Firm* — Sutherland Asbill & Brennan LLP

(57) ABSTRACT

Ambient air is compressed into a compressed ambient gas flow and delivered to a turbine combustor. At least one of an exhaust port, a bypass conduit, or an extraction conduit is opened to vent the power plant. A turbine shaft is rotated at an ignition speed and a fuel stream is delivered to the turbine combustor for mixing with the compressed ambient gas flow to form a combustible mixture. The combustible mixture is burned and forms a recirculated gas flow that drives the turbine. The recirculated gas flow is recirculated using the recirculation loop. The turbine is operated at a target operating speed and then reaches substantially stoichiometric combustion. At least a portion of the recirculated gas flow is extracted using an extraction conduit that is fluidly connected to the turbine compressor.

20 Claims, 2 Drawing Sheets

U.S. PATENT DOCUMENTS

| | | | |
|---|---|---|---|
| 4,533,314 A | 8/1985 | Herberling |
| 4,561,245 A | 12/1985 | Ball |
| 4,566,267 A | 1/1986 | Muller et al. |
| 5,165,606 A | 11/1992 | Pelet |
| 5,361,576 A | 11/1994 | Muller |
| 5,400,587 A | 3/1995 | Keler et al. |
| 5,426,932 A | 6/1995 | Morihara et al. |
| 5,557,919 A | 9/1996 | Althaus |
| 5,564,896 A | 10/1996 | Beeck et al. |
| 5,584,182 A | 12/1996 | Althaus et al. |
| 5,595,059 A | 1/1997 | Huber et al. |
| 5,674,066 A | 10/1997 | Hausermann et al. |
| 5,724,805 A | 3/1998 | Golomb et al. |
| 5,794,431 A | 8/1998 | Utamura et al. |
| 5,809,768 A | 9/1998 | Uematsu et al. |
| 6,050,082 A | 4/2000 | Leonard et al. |
| 6,082,093 A | 7/2000 | Greenwood et al. |
| 6,105,362 A | 8/2000 | Ohtomo |
| 6,202,400 B1 | 3/2001 | Utamura et al. |
| 6,256,976 B1 | 7/2001 | Kataoka et al. |
| 6,269,624 B1 | 8/2001 | Frutschi et al. |
| 6,289,666 B1 | 9/2001 | Ginter |
| 6,338,240 B1 | 1/2002 | Endo et al. |
| 6,363,709 B2 | 4/2002 | Kataoka et al. |
| 6,430,915 B1 | 8/2002 | Wiant et al. |
| 6,622,470 B2 | 9/2003 | Viteri et al. |
| 6,637,183 B2 | 10/2003 | Viteri et al. |
| 6,848,249 B2 | 2/2005 | Coleman et al. |
| 6,851,266 B2 * | 2/2005 | Liebig ............... 60/772 |
| 6,868,677 B2 | 3/2005 | Viteri et al. |
| 6,910,335 B2 | 6/2005 | Viteri et al. |
| 7,007,487 B2 | 3/2006 | Belokon |
| 7,032,388 B2 | 4/2006 | Healy |
| 7,089,743 B2 * | 8/2006 | Frutschi et al. ........... 60/772 |
| 7,127,898 B2 | 10/2006 | Healy |
| 7,383,686 B2 | 6/2008 | Aycock et al. |
| 7,490,472 B2 | 2/2009 | Lynghjem et al. |
| 7,503,178 B2 | 3/2009 | Bücker |
| 7,516,609 B2 | 4/2009 | Agnew |
| 7,726,114 B2 | 6/2010 | Evulet |
| 7,739,864 B2 * | 6/2010 | Finkenrath et al. ......... 60/39.52 |
| 7,895,822 B2 | 3/2011 | Hoffmann et al. |
| 2003/0051481 A1 | 3/2003 | Priestley et al. |
| 2004/0011057 A1 | 1/2004 | Huber |
| 2004/0134194 A1 | 7/2004 | Roby et al. |
| 2005/0028529 A1 | 2/2005 | Bartlett et al. |
| 2005/0150229 A1 | 7/2005 | Baer et al. |
| 2007/0006592 A1 | 1/2007 | Balan et al. |
| 2007/0034171 A1 | 2/2007 | Griffin et al. |
| 2007/0068167 A1 | 3/2007 | Patel et al. |
| 2007/0125063 A1 | 6/2007 | Evulat |
| 2007/0125064 A1 | 6/2007 | Sonoda |
| 2007/0125091 A1 | 6/2007 | Roby et al. |
| 2007/0220896 A1 | 9/2007 | Varatharajan et al. |
| 2008/0010967 A1 | 1/2008 | Griffin et al. |
| 2008/0104938 A1 | 5/2008 | Finkenrath et al. |
| 2008/0104939 A1 | 5/2008 | Hoffmann et al. |
| 2008/0120960 A1 | 5/2008 | Agnew |
| 2008/0309087 A1 | 12/2008 | Evulet et al. |
| 2009/0199566 A1 | 8/2009 | Lebas et al. |
| 2009/0218821 A1 | 9/2009 | Elkady et al. |
| 2009/0280003 A1 | 11/2009 | Schriner et al. |
| 2009/0284013 A1 | 11/2009 | Anand et al. |
| 2009/0301054 A1 | 12/2009 | Simpson et al. |
| 2010/0018218 A1 | 1/2010 | Riley et al. |
| 2010/0115960 A1 | 5/2010 | Brautsch et al. |
| 2010/0126181 A1 | 5/2010 | Ranasinghe et al. |
| 2010/0170218 A1 | 7/2010 | Eluripati et al. |
| 2010/0180565 A1 | 7/2010 | Draper |
| 2011/0067408 A1 | 3/2011 | Maly |
| 2011/0138766 A1 | 6/2011 | ELKady et al. |
| 2011/0289898 A1 | 12/2011 | Hellat et al. |

FOREIGN PATENT DOCUMENTS

| | | |
|---|---|---|
| EP | 2078827 A1 | 7/2009 |
| EP | 2206959 A2 | 7/2010 |

OTHER PUBLICATIONS

Bandar Duraya Al-Anazi, "Enhanced Oil Recovery Techniques and Nitrogen Injection," CSEG Recorder, 2007, 28-33.

* cited by examiner

POWER PLANT START-UP METHOD AND METHOD OF VENTING THE POWER PLANT

BACKGROUND OF THE INVENTION

The subject matter of the present disclosure relates generally to the field of electric power plants, and more particularly to methods of starting-up stoichiometric exhaust gas recirculation turbine systems. Various types of gas turbine systems are known and in use for electricity generation in power plants. Typically, the gas turbine systems include a turbine compressor for compressing an air flow and a turbine combustor that combines the compressed air with a fuel and ignites the mixture to generate an exhaust gas. The exhaust gas may then be expanded through a turbine, thereby causing the turbine to rotate, which in turn may be connected to a turbine generator via a turbine shaft, for power generation. Gas turbines have traditionally used excess air within the combustion process to control turbine temperatures and manage undesirable emissions. This often results in an exhaust stream with large amounts of excess oxygen.

Accordingly, there exists a need for a power plant arrangement that uses a gas turbine system that may operate without an exhaust stream with large amounts of excess oxygen. Furthermore, it would be desirable for the power plant arrangement to provide for the option to further reduce emissions through treatment of exhaust gases and/or to recover streams of carbon dioxide, nitrogen, and water.

SUMMARY OF THE INVENTION

In one aspect, a method for starting-up a stoichiometric exhaust gas recirculation power plant arrangement is provided. Ambient air is compressed into a compressed ambient gas flow with at least one main air compressor. At least a first portion of the compressed ambient gas flow is delivered, with a compressed ambient gas flow rate, to a turbine combustor that is fluidly connected to the at least one main air compressor. The power plant is vented by opening at least one of an exhaust port that is fluidly connected to a recirculation loop, a bypass conduit that fluidly connects a turbine compressor to the recirculation loop, or an extraction conduit that is fluidly connected to the turbine compressor. A turbine shaft, connecting a turbine to the turbine compressor, is rotated at an ignition speed. A fuel stream is delivered with a fuel stream flow rate to the turbine combustor for mixing with the at least a first portion of the compressed ambient gas flow and with at least a first portion of the recirculated gas flow to form a combustible mixture. The combustible mixture is burned in the turbine combustor and thereby forms the recirculated gas flow and drives the turbine and the turbine compressor. The recirculated gas flow is recirculated from the turbine to the turbine compressor using the recirculation loop. The turbine is then operated at a target operating speed, and, if necessary, the turbine is accelerated to the target operating speed by adjusting the fuel stream flow rate and the compressed ambient gas flow rate. The fuel stream flow rate and the compressed ambient gas flow rate are each adjusted to reach substantially stoichiometric combustion. At least a second portion of the recirculated gas flow is extracted using the extraction conduit.

In another aspect, a method for starting-up at least one master train of a stoichiometric exhaust gas recirculation power plant is provided. Ambient air is compressed into a compressed ambient gas flow with at least one main air compressor. An air supply valve that fluidly connects the at least one main air compressor to an inter-train conduit is opened. A master air injection valve that fluidly connects the inter-train conduit to a master turbine combustor is opened. At least a first portion of the compressed ambient gas flow is delivered, with a master compressed ambient gas flow rate, to the master turbine combustor that is fluidly connected to the at least one main air compressor. The at least one master train is vented by opening at least one of a master exhaust port that is fluidly connected to a master recirculation loop, a master bypass conduit that fluidly connects a master turbine compressor to the master recirculation loop, or a master extraction conduit that is fluidly connected to the master turbine compressor. A master turbine shaft connecting a master turbine to the master turbine compressor is rotated at an ignition speed. A master fuel stream is delivered, with a master fuel stream flow rate, to the master turbine combustor for mixing with the at least a first portion of the compressed ambient gas flow and with a least a first portion of a master recirculated gas flow to form a master combustible mixture. The master combustible mixture is burned in the master turbine combustor and thereby forms the master recirculated gas flow and drives the master turbine and the master turbine compressor. The master recirculated gas flow is recirculated from the master turbine to the master turbine compressor using the master recirculation loop. The master turbine is operated at a master target operating speed, and, if necessary, the master turbine is accelerated to the master target operating speed by adjusting the master fuel stream flow rate and the master compressed ambient gas flow rate. The master fuel flow rate and the master compressed ambient gas flow rate are then each adjusted to reach substantially stoichiometric combustion. At least a second portion of the master recirculated gas flow is extracted using the master extraction conduit.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

These and other features, aspects, and advantages of the present invention will become better understood when the following detailed description is read with reference to the accompanying drawings, where the components are not necessarily to scale, and in which corresponding reference numerals designate corresponding parts throughout the drawings, wherein.

DETAILED DESCRIPTION OF THE INVENTION

Figure 1:
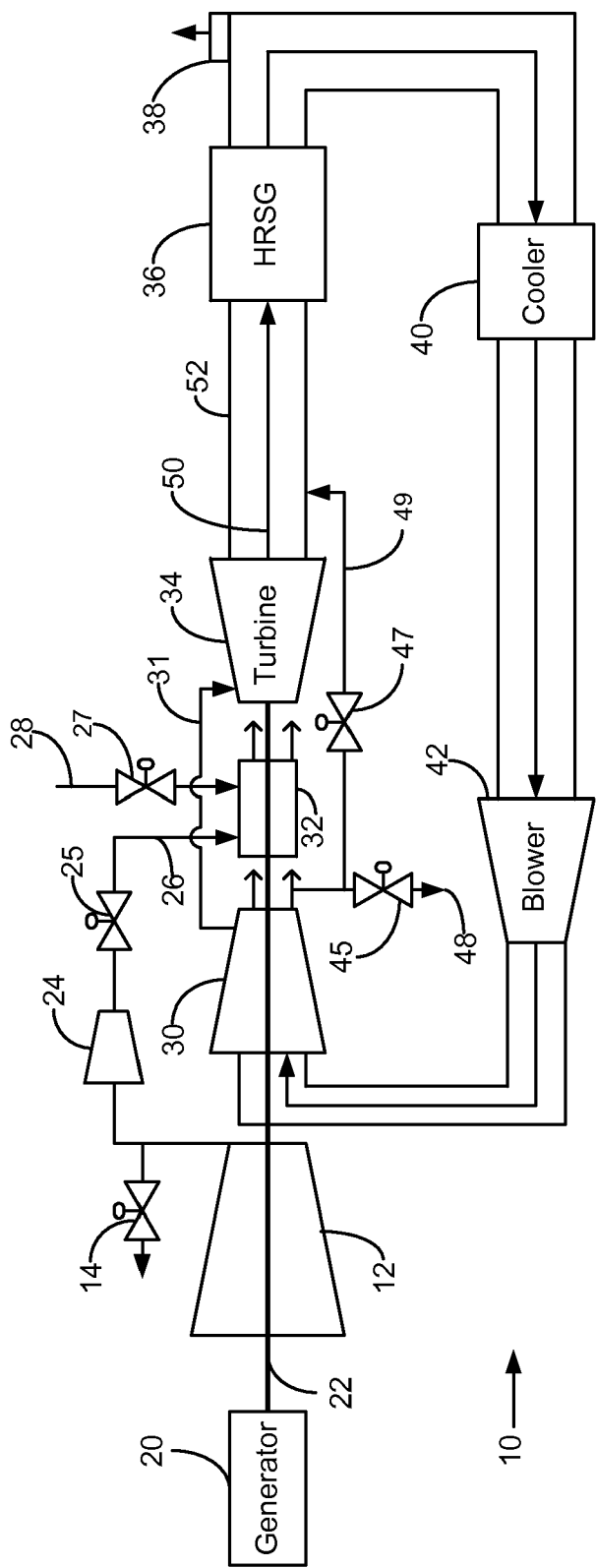
FIG. 1 is a diagrammatical illustration of an exemplary power plant arrangement 10 in accordance with an embodiment of the present invention.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Recent requirements in the power generation industry have necessitated the development of a gas turbine arrangement that may be configured to consume substantially all of the oxygen in the air working fluid to produce an essentially oxygen-free exhaust stream. Such an exhaust stream may be more easily suited to emissions reductions using $NO_x$ catalysts. Additionally, such an exhaust stream may be better suited to post combustion carbon capture solutions due to the low oxygen concentrations. Furthermore, a largely oxygen-free exhaust stream may be more easily suited to enhanced oil recovery applications.

A substantially oxygen-free exhaust from a gas turbine may be accomplished by stoichiometric burning in the combustion system. That is, the oxygen-containing fresh air supply may be matched to the fuel flow such that the combustion process operates at near combustion stoichiometry.

A stoichiometric combustion reaction of methane and oxygen is illustrated below:

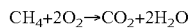

$$CH_4 + 2O_2 \rightarrow CO_2 + 2H_2O$$

Stoichiometric combustion results in gas temperatures that may be too high for the materials and cooling technology employed in gas turbine engines. In order to reduce those high temperatures, a portion of the gas turbine exhaust products may be recirculated back to the combustion system to dilute the combustion temperatures. Ideally, this diluent gas should also be significantly oxygen-free so as to not introduce additional oxygen into the system and thereby reduce the advantages of stoichiometric combustion. The gas turbine application using stoichiometric combustion and recirculated exhaust gas is referred to as Stoichiometric Exhaust Gas Recirculation (SEGR).

The SEGR system may use a supply of high pressure air fed directly into the combustion process to provide the oxygen for combustion. This air may be supplied by an auxiliary compressor. In practice, the ability of an auxiliary compressor to provide air at the pressure and flow rate required by the SEGR gas turbine will not be matched across all operating ranges of load and ambient temperature experienced by the system. The auxiliary compressor may allow the compressor to provide more air at times than is required by the gas turbine. Further, the auxiliary compressor may be designed with the capability to always provide more air than is required by the gas turbine. In some situations, it may be necessary to discharge some of the air compressed by the auxiliary compressor to the atmosphere.

As discussed in detail below, embodiments of the present invention may function to minimize emissions in gas turbine power plant systems by using an SEGR cycle that may enable substantially stoichiometric combustion reactions for power production. The SEGR gas turbine may be configured so as to provide a low oxygen content exhaust. This low oxygen content exhaust may be used with an $NO_x$ reduction catalyst to provide an exhaust stream that may also be free of $NO_x$ contaminants. In some of the specific embodiments, the present technique includes a startup sequence for operating a power plant with one or more gas turbine assemblies.

Power Plant Arrangement

Turning now to the drawings and referring first to FIG. 1 an exemplary power plant arrangement 10 is illustrated. The exemplary power plant arrangement 10 may include a main air compressor 12 for compressing ambient air into at least a first portion of a compressed ambient gas flow 26. The at least a first portion of the compressed ambient gas flow 26 may be vented to the atmosphere via a variable bleed valve 14. Further, the power plant arrangement 10 may include a turbine combustor 32 that may be fluidly connected to the main air compressor 12. The flow of the at least a first portion of the compressed ambient gas flow 26 to the turbine combustor 32 may be regulated by an air injection valve 25 to deliver the at least a first portion of the compressed ambient gas flow 26 with a compressed ambient gas flow rate.

The turbine combustor 32 may be configured to receive the at least a first portion of the compressed ambient gas flow 26 from the main air compressor 12, at least a portion of a recirculated gas flow 50 from a turbine compressor 30, and a fuel stream 28, to form a combustible mixture and to burn the combustible mixture to generate the recirculated gas flow 50. The fuel stream 28 may be regulated by a gas control valve 27 to deliver a fuel stream flow rate. In addition, the power plant arrangement 10 may include a turbine 34 located downstream of the turbine combustor 32. The turbine 34 may be configured to expand the recirculated gas flow 50 and may drive an external load such as a turbine generator 20 via a turbine shaft 22 to generate electricity. In the illustrated embodiment 10, the main air compressor 12 and the turbine compressor 30 may be driven by the power generated by the turbine 34 via the turbine shaft 22.

The main air compressor 12 may further comprise adjustable inlet guide vanes to control the flow of air into the main air compressor 12. The inlet guide vanes of the main air compressor may be used to regulate the compressed ambient gas flow rate that is delivered to the turbine combustor 32. Additionally, the turbine compressor 30 may further comprise adjustable inlet guide vanes to control the flow of air into the turbine compressor 30.

In some embodiments, a booster compressor 24 may be incorporated downstream of and in fluid connection with the main air compressor 12 and upstream of and in fluid connection with the master turbine combustor 32. The booster compressor 24 may further compress the at least a first portion of the compressed ambient gas flow 26 before delivery into the turbine combustor 32.

As used herein, the term "recirculated gas flow" refers to the gas flow generated by the burning of the combustible mixture in the turbine combustor 32 and flowing through a recirculation loop 52. In some embodiments, the recirculated gas flow 50 may comprise a low oxygen content. As used herein, the term "low oxygen content" refers to an oxygen content of below about 5 vol %, below about 2 vol %, or below about 1 vol %.

As used herein, the term "gas turbine assembly" refers to all listed components of the power plant arrangement except for the main air compressor 12. In other embodiments comprising multiple main air compressors, the term "gas turbine assembly" refers to all listed components of the power plant arrangements except for the multiple main air compressors.

In some embodiments, the gas turbine assembly may further comprise a secondary flow path 31 that may deliver at least a portion of the recirculated gas flow 50 from the turbine compressor 30 to the turbine 34 as a secondary flow. The secondary flow may be used to cool and seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34.

In some embodiments, the recirculated gas flow 50 may be directed from the turbine 34 through the recirculation loop 52 to a heat recovery steam generator 36 for the generation of steam. A steam turbine may further be configured to generate additional electricity using the steam from the heat recovery steam generator 36, and the steam turbine may be connected to a steam generator. In some embodiments, the heat recovery steam generator 36, in conjunction with the steam turbine and the steam generator, may be configured to generate additional electricity when the temperature of the recirculated gas flow 50 is in the range from about 200° C. to about 700° C., from about 260° C. to about 600° C., or from about 300° C. to about 550° C. In some embodiments, the steam turbine may be arranged to be connected to the turbine shaft 22. The recirculated gas flow 50 may then be directed back into the recirculation loop 52 to a recirculated gas flow cooler 40. In still other embodiments, the recirculation loop 52 may not contain a heat recovery steam generator 36 and the recirculated gas flow 50 may instead be introduced directly into the recirculated gas flow cooler 40 upon exit from the turbine 34. In other embodiments, the recirculation loop 52 may not comprise the recirculated gas flow cooler 40.

The recirculated gas flow cooler 40 may be incorporated into the recirculation loop 52 anywhere downstream of the turbine 34. The recirculated gas flow cooler 40 may be configured to lower the temperature of the recirculated gas flow 50 to a suitable temperature for downstream delivery into the turbine compressor 30 via the recirculation loop 52. In some embodiments, a suitable temperature may be below about 66° C., below about 49° C., or below about 45° C.

In some embodiments, a blower 42 may be fluidly connected to the recirculation loop 52 upstream of or downstream from the recirculated gas flow cooler 40. The blower 42 may be configured to increase the pressure of the recirculated gas flow 50 prior to delivery into the recirculated gas flow cooler 40 via the recirculation loop 52. In some embodiments, the blower 42 may be connected to the recirculation loop 52 upstream of the recirculated gas flow cooler 40.

In some embodiments, the exemplary power plant arrangement 10 may include a bypass conduit 49 located downstream of the turbine compressor 30 and may be in fluid connection with at least a portion of the recirculated gas flow 50 from the output of the turbine compressor 30. In other embodiments, the bypass conduit 49 may be in direct fluid contact with the turbine compressor 30 such that at least a portion of the recirculated gas flow 50 may be extracted directly from the turbine compressor 30. In some embodiments, a bypass flow through the bypass conduit 49 may be regulated by a turbine bypass valve 47. The turbine bypass valve 47 may be used to adjust a bypass flow rate through the bypass conduit 49. In some embodiments, the bypass flow may be fluidly connected to the recirculation loop 52 downstream of the turbine 34.

In some embodiments, a portion of the recirculated gas flow 50 from the output of the turbine compressor 30 may be extracted through an extraction conduit 48 which may be regulated by an extraction valve 45. In some embodiments, the extraction valve 45 may be fluidly connected to the bypass conduit 49 at a point that is either upstream of or downstream from the turbine bypass valve 47. In some embodiments, the extraction conduit 48 may be fluidly connected to a gas separation system such as a carbon capture sequestration (CCS) system. In still other embodiments, the gas separation system may produce a stream of concentrated carbon dioxide and concentrated nitrogen, both with a low oxygen content.

In some embodiments, an exhaust port from the power plant may be in fluid communication with the power plant and may be located anywhere between an output of the turbine compressor 30 and an input of the turbine compressor 30. In some embodiments, the exhaust port may be fluidly connected to the recirculation loop 52. In other embodiments, the exhaust port may be fluidly connected to the bypass conduit 49. In still other embodiments, the exhaust port may be fluidly connected to the extraction conduit 48. In some embodiments, the power plant arrangement 10 may include a damper door 38 connected to the recirculation loop 52. The damper door 38 may be opened to vent at least a portion of the recirculated gas flow 50 to the atmosphere.

As illustrated by FIG. 1, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

As used herein, the term "slave" is synonymous with the terms secondary, auxiliary, or additional. In the following embodiments, the term "slave" refers to the second of two gas turbine assemblies, but can also mean any additional gas turbine assemblies operated with a master gas turbine assembly such as is the second gas turbine assembly in the following embodiments. Furthermore, the term "master train" is synonymous with a master gas turbine assembly, while the term "slave train" is synonymous with a slave gas turbine assembly.

Figure 2:
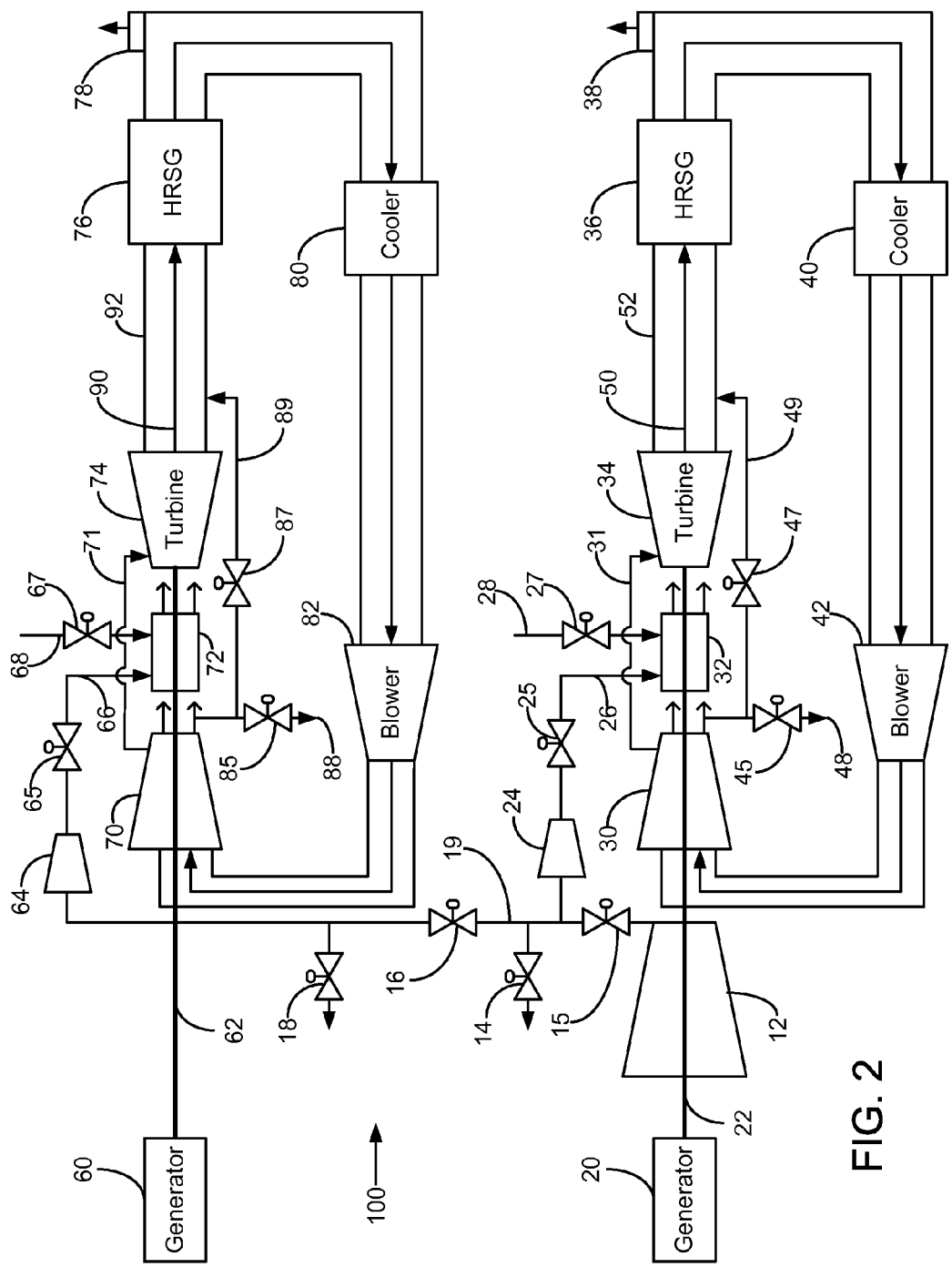
FIG. 2 is a diagrammatical illustration of another exemplary power plant arrangement 100 in accordance with an embodiment of the present invention.

As illustrated in FIG. 2, in some embodiments, the main air compressor 12 may deliver compressed ambient gas to a slave turbine combustor 72 that may be fluidly connected to the main air compressor 12 via an inter-train conduit 19. The flow of the compressed ambient gas into the inter-train conduit may be controlled by an air supply valve 15. The flow of the compressed ambient gas through the inter-train conduit 19 may be further regulated by an inter-train valve 16 to create at least a second portion of a compressed ambient gas flow 66. The at least a second portion of the compressed ambient gas flow 66 may be vented to the atmosphere via a slave variable bleed valve 18. The flow of the at least a second portion of the compressed ambient gas flow 66 to a slave turbine combustor 72 may be regulated by a slave air injection valve 65 to deliver the at least a second portion of the compressed ambient gas flow 66 with a slave compressed ambient gas flow rate.

The slave turbine combustor 72 may be configured to receive the at least a second portion of the compressed ambient gas flow 66 from the main air compressor 12, at least a portion of a slave recirculated gas flow 90 from a slave turbine compressor 70, and a slave fuel stream 68, to form a slave combustible mixture and to burn the slave combustible mixture to generate the slave recirculated gas flow 90. The slave fuel stream 68 may be regulated by a slave gas control valve 67 to deliver a slave fuel stream flow rate. In addition, the exemplary power plant arrangement 100 may include a slave turbine 74 located downstream of the slave turbine combustor 72. The slave turbine 74 may be configured to expand the slave recirculated gas flow 90 and may drive an external load such as a slave turbine generator 60 via a slave turbine shaft 62 to generate electricity.

Additionally, the slave turbine compressor 70 may further comprise adjustable inlet guide vanes to control the flow of air into the slave turbine compressor 70.

As used herein, the term "slave recirculated gas flow" refers to the gas flow generated by the burning of the slave combustible mixture in the slave turbine combustor 72 and flowing through a slave recirculation loop 92. In some embodiments, the slave recirculated gas flow 90 may comprise a low oxygen content. As used herein, the term "low oxygen content" refers to an oxygen content of below about 5 vol %, below about 2 vol %, or below about 1 vol %.

In some embodiments, the gas turbine assembly may further comprise a slave secondary flow path 71 that may deliver at least a portion of the slave recirculated gas flow 90 from the slave turbine compressor 70 to the slave turbine 74 as a slave secondary flow. The slave secondary flow may be used to cool and seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 near the output of the slave turbine 74.

In some embodiments, the slave recirculated gas flow 90 may be directed from the slave turbine combustor 72 through the slave recirculation loop 92 to a slave heat recovery steam generator 76 for the generation of steam. A slave steam turbine may be further configured to generate additional electricity using the steam from the slave heat recovery steam generator 76, and the slave steam turbine may be connected to a slave steam generator. In some embodiments, the slave heat recovery steam generator 76, in conjunction with the slave steam turbine and slave steam generator, may be configured to generate additional electricity when the temperature of the slave recirculated gas flow 90 is in the range from about 200° C. to about 700° C., from about 260° C. to about 600° C., or from about 300° C. to about 550° C. In some embodiments, the slave steam turbine may be arranged to be connected to the slave turbine shaft 62. The slave recirculated gas flow 90 may then be directed back into the slave recirculation loop 92 to a slave recirculated gas flow cooler 80. In still other embodiments, the recirculation loop 92 may not contain a slave heat recovery steam generator 76 and the slave recirculated gas flow 90 may instead be introduced directly into the slave recirculated gas flow cooler 80 upon exit from the slave turbine 74. In other embodiments, the slave recirculation loop 92 may not comprise the slave recirculated gas flow cooler 80.

The slave recirculated gas flow cooler 80 may be incorporated into the slave recirculation loop 92 anywhere downstream of the slave turbine 74. The slave recirculated gas flow cooler 80 may be configured to lower the temperature of the slave recirculated gas flow 90 to a suitable temperature for downstream delivery into the slave turbine compressor 70 via the slave recirculation loop 92. In some embodiments, a suitable temperature may be below about 66° C., below about 49° C., or below about 45° C.

In some embodiments, a slave blower 82 may be fluidly connected to the slave recirculation loop 92 upstream of or downstream from the slave recirculated gas flow cooler 80. The slave blower 82 may be configured to increase the pressure of the slave recirculated gas flow 90 prior to delivery into the slave turbine compressor 70 via the slave recirculation loop 92. In some embodiments, the slave blower 82 may be fluidly connected to the slave recirculation loop 92 upstream of the slave recirculated gas flow cooler 80.

In some embodiments, the exemplary power plant arrangement 100 may include a slave bypass conduit 89 located downstream of the slave turbine compressor 70 and may be in fluid connection with at least a portion of the slave recirculated gas flow 90 from the output of the slave turbine compressor 70. In some embodiments, a slave bypass flow through the slave bypass conduit 89 may be regulated by a slave turbine bypass valve 87. The slave turbine bypass valve 87 may be used to adjust a slave bypass flow rate through the slave bypass conduit 89. In some embodiments, the slave bypass flow may be fluidly connected to the slave recirculation loop 92 downstream of the slave turbine 74.

In some embodiments, at least a portion of the slave recirculated gas flow 90 from the output of the slave turbine compressor 70 may be extracted through a slave extraction conduit 88 which may be regulated by a slave extraction valve 85. In some embodiments, the slave extraction valve 85 may be fluidly connected to the slave bypass conduit 89 at a point that is either upstream of or downstream of the slave turbine bypass valve 87. In some embodiments, the slave extraction conduit 88 may be fluidly connected to a slave gas separation system such as a carbon capture sequestration (CCS) system. In still other embodiments, the slave gas separation system may produce a stream of concentrated carbon dioxide and concentrated nitrogen, both with a low oxygen content.

In some embodiments, a slave exhaust port from the slave train may be in fluid communication with the slave train and may be located anywhere between an output of the slave turbine compressor 70 and an input of the slave turbine compressor 70. In some embodiments, the slave exhaust port may be fluidly connected to the slave recirculation loop 92. In other embodiments, the slave exhaust port may be fluidly connected to the slave bypass conduit 89. In still other embodiments, the slave exhaust port may be fluidly connected to the slave extraction conduit 88. In some embodiments, the exemplary power plant arrangement 100 may include a slave damper door 78 connected to the slave recirculation loop 92. The slave damper door 78 may be opened to vent at least a portion of the slave recirculated gas flow 90 to the atmosphere.

As illustrated by FIG. 2, in some embodiments, the slave turbine shaft 62 may be a "cold-end drive" configuration, meaning the slave turbine shaft 62 may connect to the slave turbine generator 60 at the compressor end of the salve turbine assembly. In other embodiments, the slave turbine shaft 62 may be a "hot-end drive" configuration, meaning the slave turbine shaft 62 may connect to the slave turbine generator 60 at the turbine end of the slave turbine assembly.

In some embodiments, the power plant arrangement comprises one gas turbine assembly. In other embodiments, the power plant arrangement comprises two or more gas turbine assemblies that are fluidly connected by the inter-train conduit 19. As used herein, the term "inter-train conduit" may refer to any fluid connection between two or more gas turbine assemblies and one or more main air compressors. In still other embodiments, the power plant arrangement comprises three or more gas turbine assemblies and one or more additional main air compressors, wherein the additional main air compressors are in fluid connection with each other and with the gas turbine assemblies. In yet other embodiments, the power plant arrangement is configured for substantially stoichiometric combustion. In still other embodiments, the power plant arrangement is configured for substantially zero emissions power production.

In some embodiments, the master fuel stream 28 and/or the slave fuel stream 68 may comprise an organic gas, including but not limited to methane, propane, and/or butane. In still other embodiments, the master fuel stream 28 and/or the slave fuel stream 68 may comprise an organic liquid, including but not limited to methanol and/or ethanol. In yet other embodiments, the master fuel stream 28 and/or the slave fuel stream 68 may comprise a fuel source obtained from a solid carbonaceous material such as coal.

Start-Up Method for a Power Plant Arrangement

In an embodiment, a method for starting-up a stoichiometric exhaust gas recirculation power plant arrangement 10 is provided. Ambient air may be compressed into a compressed ambient gas flow using a main air compressor 12. At least a first portion of the compressed ambient gas flow 26, having a compressed ambient gas flow rate, may be delivered to a turbine combustor 32 that is fluidly connected to the main air compressor 12.

In some embodiments, a turbine bypass valve 47 connected to a bypass conduit 49 may be opened. The bypass conduit may be fluidly connected to an output of a turbine compressor 30 and may be configured to deliver a bypass flow to a recirculation loop 52 at a location that is downstream of a turbine 34. Additionally, an exhaust port, such as a damper door 38, may be fluidly connected to the recirculation loop 52 and may be opened such that the recirculation loop 52 may be vented to the atmosphere. In some embodiments, the exhaust port may be fluidly connected to the recirculation loop 52. In other embodiments, the exhaust port may be fluidly connected to the bypass conduit 49. In still other embodiments, the exhaust port may be fluidly connected to the extraction conduit 48. In some embodiments, the exhaust port may vent the power plant to the atmosphere. In other embodiments, the exhaust port may not vent the power plant to the atmosphere.

Purge

In some embodiments, the exemplary power plant arrangement 10 may be purged just before ignition in order to vent any combustibles that may have accumulated prior to ignition. The extraction valve 45 and the gas control valve 27 must be closed, while the air injection valve 25 must be opened for purge. In some embodiments, a turbine shaft 22 connected to the turbine 34 and to the turbine compressor 30 may be rotated at a purge speed. The rotation of the turbine shaft 22 might be accomplished with, for instance, a turbine generator 20 or a starting motor. In some embodiments, the turbine generator 20 may be equipped with a load-commutated inverter to supply rotational power to the turbine shaft 22. In some embodiments, the turbine shaft 22 may be operated at a purge speed, which may be in the range of about 20% to about 30% of the maximum turbine rotation speed. In other embodiments, the purge speed may be in the range of about 22% to about 28% of the maximum turbine rotation speed. In still other embodiments, the purge speed may be about 25% of the maximum turbine rotation speed. The exemplary power plant arrangement 10 may be operated under purge conditions until all volatile combustibles have been vented from the power plant arrangement.

During the purge step, the inlet guide vanes of the main air compressor 12 may be adjusted to control purge air flow. Additionally, during the purge step the variable bleed valve 14 may be used to vent any additional air pressure generated by the main air compressor 12, as necessary to prevent overpressurization of the gas turbine assembly.

In some embodiments, the step of purging may include the use of the booster compressor 24 which may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. The exhaust of the booster combustor 24 may be delivered to the turbine combustor 32. In some embodiments, the exhaust of the booster compressor 24 may be regulated by the air injection valve 25. In some embodiments, the step of purging may include the use of the turbine blower 42 that is located in the recirculation loop 52.

In still other embodiments, the purge step is not necessary. In such embodiments, the exemplary power plant arrangement 10 has already been purged, for instance during a previous shutdown.

Ignition

The next step is ignition of the exemplary power plant arrangement 10. The rotating turbine shaft 22 connected to the turbine 34 and to the turbine compressor 30 may be rotated at the purge speed or at an ignition speed. The rotation of the turbine shaft 22 might be accomplished with, for instance, a turbine generator 20 or a starting motor. In some embodiments, the turbine generator 20 may be equipped with a load-commutated inverter to supply rotational power to the turbine shaft 22. In some embodiments, the ignition speed may be in the range of about 10% to about 20% of the maximum turbine rotation speed. In other embodiments, the ignition speed may be in the range of about 12% to about 16% of the maximum turbine rotation speed. In still other embodiments, the ignition speed may be about 14% of the maximum turbine rotation speed.

A fuel stream 28, having a fuel stream flow rate, may be delivered to the turbine combustor 32 for mixing with the at least a first portion of the compressed ambient gas flow 26 to form a combustible mixture. Spark plugs in the turbine combustor 32 may be ignited and the combustible mixture may be burned in the turbine combustor 32 and thereby form the recirculated gas flow 50 and drive the turbine 34 connected to the turbine compressor 30 via the turbine shaft 22. As used herein, the terms "drive" and "driven" mean that both the turbine 34 and the turbine compressor 30 rotate. In some embodiments, the booster compressor 24 may be adjusted as necessary.

The recirculated gas flow 50 may then be recirculated from the turbine 34 to the turbine compressor 30 using the recirculation loop 52. The recirculation loop 52 may fluidly connect an output of the turbine 34 with an input of the turbine compressor 30. The recirculated gas flow 50 may further pass through the heat recovery steam generator 36, the recirculated gas flow cooler 40, and the turbine blower 42 en route from the output of turbine 34 to the input of turbine compressor 30.

In some embodiments, the gas turbine assembly may further comprise a secondary flow path 31 that may deliver at least a portion of the recirculated gas flow 50 from the turbine compressor 30 to the turbine 34 as a secondary flow. The secondary flow may be used to cool and seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34. The secondary flow path 31 may be used throughout the entire start-up method.

Operating at a Target Operating Speed

The next step is operating the turbine 34 at a target operating speed. In some embodiments, when the turbine 34 is connected to an electrical grid, the target operating speed may be about 3000 rpm for a 50 Hz grid or about 3600 rpm for a 60 Hz grid. In other embodiments, when the turbine 34 is not connected to an electrical grid, the target operating speed may match the required speed of auxiliary apparatus for which the turbine 34 is driving.

In some embodiments, the turbine 34 may be operating at a target operating speed after ignition. In other embodiments, the turbine 34 may need to be accelerated to a target operating speed after ignition. In some embodiments, the turbine 34 may be accelerated to a target operating speed by adjusting the fuel stream flow rate and the compressed ambient gas flow rate.

In embodiments where the turbine generator 20 is equipped with a load-commutated inverter to supply rotational power to the turbine shaft 22 during a purge step, the load-commutated inverter may be used to accelerate the turbine shaft 22 until the burning of the combustible mixture provides a turbine power that is enough to sustain the power needs of the turbine compressor 30 and/or the main air compressor 12. In some embodiments, the inverter may be disengaged before or during acceleration of the turbine 34. The turbine 34 may be driven by the recirculated gas flow 50 generated by combustion in the turbine combustor 32. In some embodiments, the step of acceleration may comprise adjusting the fuel stream flow rate by adjusting the gas control valve 27. In some embodiments, the step of acceleration may comprise adjusting the inlet guide vanes of the main air compressor 12. In some embodiments, the step of acceleration may comprise adjusting the booster compressor 24. In some embodiments, the variable bleed valve 14 may be closed to facilitate acceleration.

In embodiments, the recirculated gas flow 50 expands in the turbine 34, thereby causing the turbine 34 to rotate. As used herein, the term "driven using the recirculated gas flow" means the recirculated gas flow 50 expands upon exit from the turbine combustor 32 and upon entrance into the turbine 34, thereby causing the turbine 34 to rotate. In this embodiment, rotation of the turbine 34 causes the turbine shaft 22 and the turbine compressor 30 to also rotate.

Synchronizing to Grid and Loading

The next step may be synchronizing the exemplary power plant arrangement 10 to the power grid. In operation, the turbine generator 20 may be synchronized to a power grid and the turbine generator 20 may then be electrically connected to the power grid. As used herein, "synchronized to a power grid" means synchronizing the three phases of the alternating current of the turbine generator 20 to the three phases of the alternating current of the power grid.

The turbine shaft 22 may be connected to the turbine generator 20, such that rotation of the turbine shaft 22 may cause the turbine generator 20 to generate electricity once the turbine generator circuit breaker is closed. In some embodiments, a circuit breaker connecting the turbine generator 20 to the power grid may be closed once the turbine generator 20 is synchronized to the power grid.

In some embodiments, the gas turbine assembly may then be loaded to a desired load point. As used herein, the term "loaded" means that the rotation of the turbine shaft 22 in the turbine generator 20 is converted from mechanical energy to electrical energy, wherein the electrical energy is transferred to the power grid.

In other embodiments, the turbine shaft 22 may not be connected to a turbine generator 20. In some embodiments, the turbine shaft 22 may instead be used as a mechanical drive for auxiliary apparatus.

During loading, the fuel stream flow rate and the compressed ambient gas flow rate may be adjusted as necessary. In some embodiments, the booster compressor 24 may be adjusted during loading as necessary.

In some embodiments, the recirculated gas flow 50 may be directed through the heat recovery steam generator 36 for the generation of steam. A steam turbine may be further configured to generate additional electricity using the steam from the heat recovery steam generator 36, and the steam turbine may be connected to a steam generator. In some embodiments, the heat recovery steam generator 36 may be configured to generate additional electricity, in conjunction with the steam turbine and steam generator, when the temperature of the recirculated gas flow 50 is in the range from about 200° C. to about 700° C., from about 260° C. to about 600° C., or from about 300° C. to about 550° C. In some embodiments, the steam turbine may be connected to the turbine shaft 22.

Stoichiometric Combustion

The next step may be reaching substantially stoichiometric combustion. As used herein, the term "substantially stoichiometric combustion" means that the combustion reaction involves substantially stoichiometric burning of fuel and oxygen in the combustion system. In other terms, the oxygen content after the combustion reaction may be below about 5 vol %, below about 2 vol %, or below about 1 vol %. The step of reaching substantially stoichiometric combustion may also be performed prior to loading. The step comprises adjusting the fuel stream flow rate and the compressed ambient gas flow rate to reach substantially stoichiometric combustion. In operation, the fuel stream flow rate of the fuel stream 28 to the turbine combustor 32 may be regulated by a gas control valve 27 an effective amount to achieve substantially stoichiometric combustion. Additionally, the compressed ambient gas flow rate of the at least a first portion of the compressed ambient gas flow 26 from the main air compressor 12 to the turbine combustor 32 may be adjusted using the inlet guide vanes of the main air compressor 12 and/or the booster compressor 24.

Extraction

The next step may be extracting a low-oxygen content stream from the exemplary power plant arrangement 10. An exhaust port, such as the damper door 38, may be closed. In some embodiments, the turbine bypass valve 47 may be closed. At least a portion of the recirculated gas flow 50 may be extracted using an extraction conduit 48 that is fluidly connected to the output of the turbine compressor 30. An extraction valve 45, which fluidly connects the extraction conduit 48 to a gas separation system, may further be opened.

In some embodiments, at least a portion of the recirculated gas flow 50 from the output of the turbine compressor 30 may be extracted through the extraction conduit 48 which may be regulated by an extraction valve 45. In some embodiments, the extraction valve 45 may be fluidly connected to the bypass conduit 49 at a point that is either upstream of or downstream of the turbine bypass valve 47. In some embodiments, the extraction conduit 48 may be fluidly connected to a gas separation system such as a carbon capture sequestration (CCS) system. In still other embodiments, the gas separation system may produce a stream of concentrated carbon dioxide and concentrated nitrogen, both with a low oxygen content. In some embodiments, the booster compressor 24 may be adjusted as necessary.

Start-Up Method for a Master Train and a Slave Train

As used herein, the term "master train" refers to any gas turbine assembly that also includes a main air compressor. As used herein, the term "slave train" refers to any gas turbine assembly that does not also include a main air compressor. Thus, any given slave train requires at least one master train for operation.

Master Train Start-Up

In an embodiment, a method for starting-up the master train of a stoichiometric exhaust gas recirculation power plant arrangement 100 is provided. Ambient air may be compressed into a compressed ambient gas flow using a main air compressor 12. An air injection valve 15 may be opened to allow the delivery of the compressed ambient gas flow into an inter-train conduit 19. A master air injection valve 25, fluidly connecting the inter-train conduit 19 to a master turbine combustor 32, may also be opened. At least a first portion of the compressed ambient gas flow 26, having a compressed ambient gas flow rate, may be delivered to a master turbine combustor 32 that is fluidly connected to the main air compressor 12.

In some embodiments, a master turbine bypass valve 47 connected to a master bypass conduit 49 may be opened. The master bypass conduit 49 may be fluidly connected to an output of a master turbine compressor 30 and may be configured to deliver a master bypass flow to a master recirculation loop 52 at a location that is downstream of a master turbine 34. Additionally, a master exhaust port, such as a master damper door 38, that may be fluidly connected to the master recirculation loop 52 may be opened such that the master recirculation loop 52 may be vented to the atmosphere. In some embodiments, the master exhaust port may be fluidly connected to the master recirculation loop 52. In other embodiments, the master exhaust port may be fluidly connected to the master bypass conduit 49. In still other embodiments, the master exhaust port may be fluidly connected to the master extraction conduit 48. In embodiments, the master exhaust port may vent the master train to the atmosphere. In other embodiments, the master exhaust port may not vent the master train to the atmosphere.

Purging the Master Train

In some embodiments, the master train of the exemplary power plant arrangement 100 may be purged just before ignition in order to vent any combustibles that may have accumulated in the master train prior to ignition. The master extraction valve 45 and the master gas control valve 27 must be closed, while the master air injection valve 25 must be opened for purge. In some embodiments, a master turbine shaft 22 connected to the master turbine 34 and to the master turbine compressor 30 may be rotated at a purge speed. The rotation of the master turbine shaft 22 might be accomplished with, for instance, a master turbine generator 20 or a starting motor. In some embodiments, the master turbine generator 20 may be equipped with a load-commutated inverter to supply rotational power to the master turbine shaft 22. In some embodiments, the master turbine shaft 22 may be operated at a purge speed, which may be in the range of about 20% to about 30% of the maximum turbine rotation speed. In other embodiments, the purge speed may be in the range of about 22% to about 28% of the maximum turbine rotation speed. In still other embodiments, the purge speed may be about 25% of the maximum turbine rotation speed. The exemplary power plant arrangement 100 may be operated under purge conditions until all volatile combustibles have been vented from the master train.

During the purge step, the inlet guide vanes of the main air compressor 12 may be adjusted to control the master purge air flow. Additionally, during the purge step the variable bleed valve 14 may be used to vent any additional air pressure generated by the main air compressor 12, as necessary, to prevent over-pressurization of the master gas turbine assembly.

In some embodiments, the step of purging may include the use of the master booster compressor 24 which may be incorporated downstream of and in fluid connection with the main air compressor 12 and upstream of and in fluid connection with the master turbine combustor 32. The master booster compressor 24 may further compress the at least a first portion of the compressed ambient gas flow 26 before delivery into the master turbine combustor 32. The exhaust of the master booster combustor 24 may be delivered to the master turbine combustor 32. In some embodiments, the exhaust of the master booster compressor 24 may be regulated by the master air injection valve 25. In some embodiments, the step of purging may include the use of the master turbine blower 42 that is located in the master recirculation loop 52.

In still other embodiments, the purge step is not necessary. In such embodiments, the master train of the exemplary power plant arrangement 100 has already been purged, for instance during a previous shutdown.

Ignition of the Master Train

The next step is ignition of the master train in the exemplary power plant arrangement 100. The master turbine shaft 22 connected to the master turbine 34 and to the master turbine compressor 30 may be rotated at the purge speed or at an ignition speed. The rotation of the master turbine shaft 22 might be accomplished with, for instance, a master turbine generator 20 or a starting motor. In some embodiments, the master turbine generator 20 may be equipped with a load-commutated inverter to supply rotational power to the master turbine shaft 22. In some embodiments, the ignition speed may be in the range of about 10% to about 20% of the maximum turbine rotation speed. In other embodiments, the ignition speed may be in the range of about 12% to about 16% of the maximum turbine rotation speed. In still other embodiments, the ignition speed may be about 14% of the maximum turbine rotation speed.

A master fuel stream 28, having a master fuel stream flow rate, may be delivered to the master turbine combustor 32 for mixing with the at least a first portion of the compressed ambient gas flow 26 to form a master combustible mixture. Spark plugs in the master turbine combustor 32 may be ignited and the master combustible mixture may be burned in the master turbine combustor 32 and thereby form the master recirculated gas flow 50 and drive the master turbine 34 connected to the master turbine compressor 30 via the master turbine shaft 22. As used herein, the term "driving" means that both the master turbine 34 and the master turbine compressor 30 rotate. In some embodiments, the master booster compressor 24 may be adjusted during ignition as necessary.

The master recirculated gas flow 50 may then be recirculated from the master turbine 34 to the master turbine compressor 30 using the master recirculation loop 52. The master recirculation loop 52 may fluidly connect an output of the master turbine 34 with an input of the master turbine compressor 30. The master recirculated gas flow 50 may further pass through the master heat recovery steam generator 36, the master recirculated gas flow cooler 40, and the master turbine blower 42 en route from the output of the master turbine 34 to the input of master turbine compressor 30.

In some embodiments, the master train may further comprise a master secondary flow path 31 that may deliver at least a portion of the master recirculated gas flow 50 from the master turbine compressor 30 to the master turbine 34 as a master secondary flow. The master secondary flow may be used to cool and to seal the master turbine 34, including individual components of the master turbine 34 such as the turbine shroud, the turbine nozzle, the turbine blade tip, the turbine bearing support housing, and the like. After cooling and sealing the master turbine 34 and any individual master turbine components, the master secondary flow may be directed into the master recirculation loop 52 near the output of the master turbine 34. The master secondary flow path 31 may be used throughout the entire start-up method.

Operating the Master Train at a Master Target Operating Speed

The next step is operating the master turbine 34 at a master target operating speed. In some embodiments, when the master turbine 34 is connected to an electrical grid, the master target operating speed may be about 3000 rpm for a 50 Hz grid or about 3600 rpm for a 60 Hz grid. In other embodiments, when the master turbine 34 is not connected to an electrical grid, the master target operating speed may match the required speed of auxiliary apparatus for which the master turbine 34 is driving.

In some embodiments, the master turbine 34 may be operating at a master target operating speed after ignition. In other embodiments, the master turbine 34 may need to be accelerated to a master target operating speed after ignition. In some embodiments, the master turbine 34 may be accelerated to a master target operating speed by adjusting the master fuel stream flow rate and the master compressed ambient gas flow rate.

In embodiments where the master turbine generator 20 is equipped with a load-commutated inverter to supply rotational power to the master turbine shaft 22 during a purge step, the load-commutated inverter may be used to accelerate the master turbine shaft 22 until the burning of the master combustible mixture provides a master turbine power that is enough to sustain the power needs of the master turbine compressor 30 and/or the main air compressor 12. In some embodiments, the inverter may be disengaged before or during acceleration of the master turbine 34. The master turbine 34 may be driven by the master recirculated gas flow 50 generated by combustion in the master turbine combustor 32. In some embodiments, the step of acceleration may comprise adjusting the master fuel stream flow rate by adjusting the master gas control valve 27. In some embodiments, the step of acceleration may comprise adjusting the inlet guide vanes of the main air compressor 12. In some embodiments, the step of acceleration may comprise adjusting the master booster compressor 24. In some embodiments, the master variable bleed valve 14 may be closed to facilitate acceleration.

In embodiments, the master recirculated gas flow 50 expands in the master turbine 34, thereby causing the master turbine 34 to rotate. As used herein, the term "driven using the master recirculated gas flow" means the master recirculated gas flow 50 expands upon exit from the master turbine combustor 32 and upon entrance into the master turbine 34, thereby causing the master turbine 34 to rotate. In this embodiment, rotation of the master turbine 34 causes the master turbine shaft 22 and the master turbine compressor 30 to also rotate.

Synchronizing the Master Train to the Grid and Loading

The next step may be synchronizing the master train to the power grid. In operation, the master turbine generator 20 may be synchronized to a power grid and the master turbine generator 20 may then be electrically connected to the power grid. As used herein, "synchronized to a power grid" means synchronizing the three phases of the alternating current of the master turbine generator 20 to the three phases of the alternating current of the power grid.

The master turbine shaft 22 may be connected to the master turbine generator 20, such that rotation of the master turbine shaft 22 may cause the master turbine generator 20 to generate electricity once the master turbine generator circuit breaker is closed. In some embodiments, a master circuit breaker connecting the master turbine generator 20 to the power grid may be closed once the master turbine generator 20 is synchronized to the power grid.

In some embodiments, the master train may then be loaded to a desired load point. As used herein, the term "loaded" means that the rotation of the master turbine shaft 22 in the master turbine generator 20 is converted from mechanical energy to electrical energy, wherein the electrical energy is transferred to the power grid.

In other embodiments, the turbine shaft 22 may not be connected to a turbine generator 20. In some embodiments, the turbine shaft 22 may instead be used as a mechanical drive for auxiliary apparatus.

During loading, the master fuel stream flow rate and the master compressed ambient gas flow rate may be adjusted as necessary. In some embodiments, the master booster compressor 24 may be adjusted during loading as necessary.

In some embodiments, the master recirculated gas flow 50 may be directed through the master heat recovery steam generator 36 for the generation of steam. A master steam turbine may be further configured to generate additional electricity using the steam from the master heat recovery steam generator 36, and the master steam turbine may be connected to a master steam generator. In some embodiments, the master heat recovery steam generator 36, in conjunction with the master steam turbine and the master steam generator, may be configured to generate additional electricity when the temperature of the master recirculated gas flow 50 is in the range from about 200° C. to about 700° C., from about 260° C. to about 600° C., or from about 300° C. to about 550° C. In some embodiments, the master steam turbine may be connected to the master turbine shaft 22.

Master Train Stoichiometric Combustion

The next step may be reaching substantially stoichiometric combustion in the master train. The step of reaching substantially stoichiometric combustion may also be performed prior to loading. The step comprises adjusting the master fuel stream flow rate and the master compressed ambient gas flow rate to reach substantial combustion stoichiometry. As used herein, the term "substantially stoichiometric combustion" means that the oxygen content after the combustion reaction may be below about 5 vol %, below about 2 vol %, or below about 1 vol %. In operation, the master fuel stream flow rate of the master fuel stream 28 to the master turbine combustor 32 may be regulated by a master gas control valve 27 an effective amount to achieve substantially stoichiometric combustion. Additionally, the master compressed ambient gas flow rate of the at least a first portion of the compressed ambient gas flow 26 from the main air compressor 12 to the master turbine combustor 32 may be adjusted using the inlet guide vanes of the main air compressor 12. In some embodiments, the master booster compressor 24 may be adjusted as necessary.

In some embodiments, the air supply valve 15 may be adjusted as necessary. Additionally, in some embodiments, the master air injection valve 25 may be adjusted.

Master Train Extraction

The next step may be extracting a low-oxygen stream from the master train of the exemplary power plant arrangement 100. A master exhaust port, such as the master damper door 38, may be closed. Additionally, the master turbine bypass valve 47 may be closed. At least a portion of the master recirculated gas flow 50 may be extracted using a master extraction conduit 48 that is fluidly connected to the output of the master turbine compressor 30. A master extraction valve 45, which fluidly connects the master extraction conduit 48 to a master gas separation system, may further be opened.

In some embodiments, at least a portion of the master recirculated gas flow 50 from the output of the master turbine compressor 30 may be extracted through the master extraction conduit 48 which may be regulated by a master extraction valve 45. In some embodiments, the master extraction valve 45 may be fluidly connected to the master bypass conduit 49 at a point that is either upstream of or downstream of the master turbine bypass valve 47. In some embodiments, the master extraction conduit 48 may be fluidly connected to a master gas separation system such as a carbon capture sequestration (CCS) system. In still other embodiments, the master gas separation system may produce a stream of concentrated carbon dioxide and concentrated nitrogen, both with a low oxygen content. In some embodiments, the master booster compressor 24 may be adjusted as necessary.

Slave Train Start-Up

In an embodiment, a method for starting-up the slave train of a stoichiometric exhaust gas recirculation power plant arrangement 100 is provided. Ambient air may be compressed into a compressed ambient gas flow using a main air compressor 12. The inter-train valve 16 may be opened and the slave bleed valve 18 may be closed. A slave air injection valve 65, fluidly connecting the inter-train conduit 19 to a slave turbine combustor 72, may be opened. At least a second portion of the compressed ambient gas flow 66, having a slave compressed ambient gas flow rate, may be delivered to a slave turbine combustor 72 that is fluidly connected to the main air compressor 12.

In some embodiments, a slave turbine bypass valve 87 connected to a slave bypass conduit 89 may be opened. The slave bypass conduit 89 may be fluidly connected to an output of a slave turbine compressor 70 and may be configured to deliver a slave bypass flow to a slave recirculation loop 92 at a location that is downstream of a slave turbine 74. Additionally, a slave exhaust port, such as a slave damper door 78, that may be fluidly connected to the slave recirculation loop 92, may be opened such that the slave recirculation loop 92 may be vented to the atmosphere. In some embodiments, the slave exhaust port may be fluidly connected to the slave recirculation loop 92. In other embodiments, the slave exhaust port may be fluidly connected to the slave bypass conduit 89. In still other embodiments, the slave exhaust port may be fluidly connected to the slave extraction conduit 88. In embodiments, the slave exhaust port may vent the slave train to the atmosphere. In other embodiments, the slave exhaust port may not vent the slave train to the atmosphere.

Purging the Slave Train

In some embodiments, the slave train of the exemplary power plant arrangement 100 may be purged just before ignition in order to vent any combustibles that may have accumulated in the slave train prior to ignition. The slave extraction valve 85 and the slave gas control valve 67 must be closed, while the slave air injection valve 65 must be opened for purge. In some embodiments, a slave turbine shaft 62 connected to the slave turbine 74 and to the slave turbine compressor 70 may be rotated at a purge speed. The rotation of the slave turbine shaft 62 might be accomplished with, for instance, a slave turbine generator 60 or a starting motor. In some embodiments, the slave turbine generator 60 may be equipped with a load-commutated inverter to supply rotational power to the slave turbine shaft 62. In some embodiments, the slave turbine shaft 62 may be operated at a purge speed, which may be in the range of about 20% to about 30% of the maximum turbine rotation speed. In other embodiments, the purge speed may be in the range of about 22% to about 28% of the maximum turbine rotation speed. In still other embodiments, the purge speed may be about 25% of the maximum turbine rotation speed. The slave train of the exemplary power plant arrangement 100 may be operated under purge conditions until all volatile combustibles have been vented from the slave train.

During the purge step, the slave air injection valve 65 may be adjusted to control the purge air flow.

In some embodiments, the step of purging may include the use of the slave booster compressor 64 which may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72. The exhaust of the slave booster compressor 64 may be delivered to the slave turbine combustor 72. In some embodiments, the exhaust of the slave booster compressor 64 may be regulated by the slave air injection valve 65. In some embodiments, the step of purging may include the use of the slave turbine blower 82 that is located in the slave recirculation loop 92.

In still other embodiments, the purge step is not necessary. In such embodiments, the slave train of the exemplary power plant arrangement 100 has already been purged, for instance during a previous shutdown.

Ignition of the Slave Train

The next step is ignition of the slave train in the exemplary power plant arrangement 100. The slave turbine shaft 62 connected to the slave turbine 74 and to the slave turbine compressor 70 may be rotated at the purge speed or at an ignition speed. The rotation of the slave turbine shaft 62 might be accomplished with, for instance, a slave turbine generator 60 or a starting motor. In some embodiments, the slave turbine generator 60 may be equipped with a load-commutated inverter to supply rotational power to the slave turbine shaft 62. In some embodiments, the ignition speed may be in the range of about 10% to about 20% of the maximum turbine rotation speed. In other embodiments, the ignition speed may be in the range of about 12% to about 16% of the maximum turbine rotation speed. In still other embodiments, the ignition speed may be about 14% of the maximum turbine rotation speed.

A slave fuel stream 68, having a slave fuel stream flow rate, may be delivered to the slave turbine combustor 72 for mixing with the at least a second portion of the compressed ambient gas flow 66 to form a slave combustible mixture. Spark plugs in the slave turbine combustor 72 may be ignited and the slave combustible mixture may be burned in the slave turbine combustor 72 and thereby form the slave recirculated gas flow 90 and drive the slave turbine 74 connected to the slave turbine compressor 70 via the slave turbine shaft 62. As used herein, the term "driving" means that both the slave turbine 74 and the slave turbine compressor 70 rotate. In some embodiments, the slave booster compressor 64 may be adjusted as necessary.

The slave recirculated gas flow 90 may then be recirculated from the slave turbine 74 to the slave turbine compressor 70 using the slave recirculation loop 92. The slave recirculation loop 92 may fluidly connect an output of the slave turbine 74 with an input of the slave turbine compressor 70. The slave recirculated gas flow 90 may further pass through the slave heat recovery steam generator 76, the slave recirculated gas flow cooler 80, and the slave turbine blower 82 en route from the output of the slave turbine 74 to the input of slave turbine compressor 70.

In some embodiments, the slave train may further comprise a slave secondary flow path 71 that may deliver at least a portion of the slave recirculated gas flow 90 from the slave turbine compressor 70 to the slave turbine 74 as a slave secondary flow. The slave secondary flow may be used to cool and to seal the slave turbine 74, including individual components of the slave turbine 74 such as the turbine shroud, the turbine nozzle, the turbine blade tip, the turbine bearing support housing, and the like. After cooling and sealing the slave turbine 74 and any individual slave turbine components, the slave secondary flow may be directed into the slave recirculation loop 92 near the output of the slave turbine 74. The slave secondary flow path 71 may be used throughout the entire start-up method.

Operating the Slave Train at a Slave Target Operating Speed

The next step is operating the slave turbine 74 at a slave target operating speed. In some embodiments, when the slave turbine 74 is connected to an electrical grid, the target operating speed may be about 3000 rpm for a 50 Hz grid or about 3600 rpm for a 60 Hz grid. In other embodiments, when the slave turbine 74 is not connected to an electrical grid, the slave target operating speed may match the required speed of auxiliary apparatus for which the slave turbine 74 is driving. In some embodiments, the master target operating speed and the slave target operating speed are the same. In other embodiments, the master target operating speed and the slave target operating speed are not the same.

In some embodiments, the slave turbine 74 may be operating at a slave target operating speed after ignition. In other embodiments, the slave turbine 74 may need to be accelerated to a slave target operating speed after ignition. In some embodiments, the slave turbine 74 may be accelerated to a slave target operating speed by adjusting the slave fuel stream flow rate and the slave compressed ambient gas flow rate.

In embodiments where the slave turbine generator 60 is equipped with a load-commutated inverter to supply rotational power to the slave turbine shaft 62 during a purge step, the load-commutated inverter may be used to accelerate the slave turbine shaft 62 until the burning of the slave combustible mixture provides a slave turbine power that is enough to sustain the power needs of the slave turbine compressor 70. In some embodiments, the inverter may be disengaged before or during acceleration of the slave turbine 74. The slave turbine 74 may be driven by the slave recirculated gas flow 90 generated by combustion in the slave turbine combustor 72. In some embodiments, the step of acceleration may comprise adjusting the slave fuel stream flow rate by adjusting the slave gas control valve 67. In some embodiments, the step of acceleration may comprise adjusting the slave booster compressor 64. In some embodiments, the slave variable bleed valve 18 may be closed to facilitate acceleration. In some embodiments, the air supply valve 15 may be adjusted during acceleration as necessary.

In this embodiment, the slave recirculated gas flow 90 may expand in the slave turbine 74, thereby causing the slave turbine 74 to rotate. As used herein, the term "driven using the slave recirculated gas flow" means the slave recirculated gas flow 90 expands upon exit from the slave turbine combustor 72 and upon entrance into the slave turbine 74, thereby causing the slave turbine 74 to rotate. In this embodiment, rotation of the slave turbine 74 causes the slave turbine shaft 62 and the slave turbine compressor 70 to also rotate.

Synchronizing the Slave Train to the Grid and Loading

The next step may be synchronizing the slave train to the power grid. In operation, the slave turbine generator 60 may be synchronized to a power grid and the slave turbine generator 60 may then be electrically connected to the power grid. As used herein, "synchronized to a power grid" means synchronizing the three phases of the alternating current of the slave turbine generator 60 to the three phases of the alternating current of the power grid.

The slave turbine shaft 62 may be connected to the slave turbine generator 60, such that rotation of the slave turbine shaft 62 may cause the slave turbine generator 60 to generate electricity once the slave turbine generator circuit breaker is closed. In some embodiments, a slave circuit breaker connecting the slave turbine generator 60 to the power grid may be closed once the slave turbine generator 60 is synchronized to the power grid.

In some embodiments, the slave train may then be loaded to a desired load point. As used herein, the term "loaded" means that the rotation of the slave turbine shaft 62 in the slave turbine generator 60 is converted from mechanical energy to electrical energy, wherein the electrical energy is transferred to the power grid.

During loading, the slave fuel stream flow rate and the slave compressed ambient gas flow rate may be adjusted as necessary. In some embodiments, the slave booster compressor 64 may be adjusted as necessary.

In some embodiments, the slave recirculated gas flow 90 may be directed through the slave heat recovery steam generator 76 for the generation of steam. A slave steam turbine may be further configured to generate additional electricity using the steam from the slave heat recovery steam generator 76, and the slave steam turbine may be connected to a slave steam generator. In some embodiments, the slave heat recovery steam generator 76, in conjunction with the slave steam turbine and slave steam generator, may be configured to generate additional electricity, in conjunction with the slave steam turbine and the slave steam generator, when the temperature of the slave recirculated gas flow 90 is in the range from about 200° C. to about 700° C., from about 260° C. to about 600° C., or from about 300° C. to about 550° C. In some embodiments, the slave steam turbine may be connected to the slave turbine shaft 62.

Slave Train Stoichiometric Combustion

The next step may be reaching substantially stoichiometric combustion in the slave train. The step of reaching substantially stoichiometric combustion may also be performed prior to loading. The step comprises adjusting the slave fuel stream flow rate and the slave compressed ambient gas flow rate to reach substantial combustion stoichiometry. As used herein, the term "substantially stoichiometric combustion" means that the oxygen content after the combustion reaction may be below about 5 vol %, below about 2 vol %, or below about 1 vol %. In operation, the slave fuel stream flow rate of the slave fuel stream 68 to the slave turbine combustor 72 may be regulated by a slave gas control valve 67 an effective amount to achieve substantially stoichiometric combustion. Additionally, the slave compressed ambient gas flow rate of the at least a second portion of the compressed ambient gas flow 66 from the main air compressor 12 to the slave turbine combustor 32 may be adjusted using the slave air injection valve 65. In some embodiments, the slave booster compressor 64 may be adjusted as necessary.

Slave Train Extraction

The next step may be extracting a low-oxygen stream from the slave train of the exemplary power plant arrangement 100. A slave exhaust port, such as the slave damper door 78, may be closed. Additionally, the slave turbine bypass valve 87 may be closed. At least a portion of the slave recirculated gas flow 90 may be extracted using a slave extraction conduit 88 that is fluidly connected to the output of the slave turbine compressor 70. A slave extraction valve 85, which fluidly connects the slave extraction conduit 88 to a slave gas separation system, may further be opened.

In some embodiments, at least a portion of the slave recirculated gas flow 90 from the output of the slave turbine compressor 70 may be extracted through the slave extraction conduit 88 which may be regulated by a slave extraction valve 85. In some embodiments, the slave extraction valve 85 may be fluidly connected to the slave bypass conduit 89 at a point that is either upstream of or downstream of the slave turbine bypass valve 87. In some embodiments, the slave extraction conduit 88 may be fluidly connected to a slave gas separation system such as a carbon capture sequestration (CCS) system. In still other embodiments, the slave gas separation system may produce a stream of concentrated carbon dioxide and concentrated nitrogen, both with a low oxygen content. In some embodiments, the slave booster compressor 64 may be adjusted as necessary.

In practice, there are various ways to start one or more master trains and one or more slave trains. Initially, each train will have a purge status. If a train has previously been purged, then no purge is needed. If, however, one or more trains have not been previously purged, then purging will be needed. For purging, all unpurged trains may be purged at once, each train may be purged prior to individual starting, or unpurged trains may be purged in waves, as needed.

Once all of the trains that will be started are in a purged state (either by purging or having been purged on a previous shutdown), there are several options for how to start the trains. The one caveat is that at least one master train must be started before a single slave train may be started. In some situations, all trains may be started simultaneously. Other options include starting one master train and then one or more slave trains, followed by starting a second master train and then one or more slave trains. Alternatively, all of the master trains may be started and then all of the slave trains may then be started. Or, each master train may be started individually followed by starting each slave train individually. Another option might be to start all of the master trains, and then start each slave train as needed. In the end, however, any start sequence may lead to any final state wherein one or more master trains are running and one or more slave trains are running.

Other configurations and methods of operation are provided by U.S. patent applications including "Power Plant and Method of Use" to Daniel Snook, Lisa Wichmann, Sam Draper, and Noemie Dion Ouellet (filed Aug. 25, 2011), "Power Plant and Method of Operation" to Daniel Snook, Lisa Wichmann, Sam Draper, Noemie Dion Ouellet, and Scott Rittenhouse (filed Aug. 25, 2011), "Power Plant and Method of Operation" to Daniel Snook, Lisa Wichmann, Sam Draper, Noemie Dion Ouellet, and Scott Rittenhouse (filed Aug. 25, 2011), "Power Plant and Control Method" to Daniel Snook, Lisa Wichmann, Sam Draper, and Noemie Dion Ouellet (filed Aug. 25, 2011), "Power Plant and Method of Operation" to Predrag Popovic (filed Aug. 25, 2011), "Power Plant and Method of Operation" to Sam Draper and Kenneth Kohl (filed Aug. 25, 2011), "Power Plant and Method of Operation" to Sam Draper (filed Aug. 25, 2011), "Power Plant and Method of Operation" to Sam Draper (filed Aug. 25, 2011), "Power Plant and Method of Operation" to Lisa Wichmann (filed Aug. 25, 2011), and "Power Plant and Control Method" to Karl Dean Minto (filed Aug. 25, 2011), the disclosures of which are incorporated by reference herein.

It should be apparent that the foregoing relates only to the preferred embodiments of the present invention and that numerous changes and modifications may be made herein without departing from the spirit and the scope of the invention as defined by the following claims and equivalents thereof.

We claim:

1. A method for starting-up a stoichiometric exhaust gas recirculation power plant arrangement, comprising the steps of:
   compressing ambient air into a compressed ambient gas flow with at least one main air compressor;
   delivering at least a first portion of the compressed ambient gas flow, with a compressed ambient gas flow rate, to a turbine combustor that is fluidly connected to the at least one main air compressor;
   providing an extraction conduit that is fluidly connected to a turbine compressor;
   venting the power plant by opening a vent, wherein the vent comprises at least one of the extraction conduit or an exhaust port, wherein the exhaust port is fluidly connected to a recirculation loop
   rotating a turbine shaft connecting a turbine to the turbine compressor at an ignition speed;
   delivering a fuel stream, having a fuel stream flow rate, to the turbine combustor for mixing with the at least a first portion of the compressed ambient gas flow from the at least one main air compressor and with at least a first portion of a recirculated gas flow from the turbine compressor to form a combustible mixture;
   burning the combustible mixture in the turbine combustor and thereby forming the recirculated gas flow and driving the turbine and the turbine compressor;
   recirculating the recirculated gas flow from the turbine to the turbine compressor using the recirculation loop;
   operating the turbine at a target operating speed, and, if necessary, accelerating the turbine to the target operating speed by adjusting the fuel stream flow rate and the compressed ambient gas flow rate;
   adjusting the fuel stream flow rate and the compressed ambient gas flow rate to reach substantially stoichiometric combustion; and
   extracting at least a second portion of the recirculated gas flow using the extraction conduit.

2. The method of claim 1, further comprising the step of synchronizing a turbine generator, mechanically connected to the turbine shaft, to a power grid.

3. The method of claim 2, further comprising the step of loading the turbine generator to a load point by increasing the fuel stream flow rate and the compressed ambient gas flow rate.

4. The method of claim 1, further comprising the step of purging the power plant arrangement before the step of delivering a fuel stream to the turbine combustor, wherein the turbine shaft is rotated at a purge speed and the at least a first portion of compressed ambient gas flow is used to vent substantially all combustibles from the power plant arrangement.

5. The method of claim 1, further comprising delivering a secondary flow through a secondary flow path, wherein the secondary flow path delivers at least a third portion of the recirculated gas flow from the turbine compressor to the turbine for cooling and sealing the turbine and thereafter into the recirculation loop.

6. The method of claim 1, further comprising delivering at least a third portion of the recirculated gas flow from the turbine compressor to a bypass conduit, wherein the bypass conduit is configured to deliver the recirculated gas flow to the recirculation loop downstream of the turbine.

7. The method of claim 1, wherein one or more steps are performed simultaneously.

8. The method of claim 1, wherein the step of accelerating the turbine to a target operating speed further comprises adjusting a variable bleed valve that is in fluid communication with the at least one main air compressor and that is configured to vent a portion, if any, of the compressed ambient gas flow to the atmosphere.

9. A method for starting-up at least one master train of a stoichiometric exhaust gas recirculation power plant arrangement, comprising the steps of:

compressing ambient air into a compressed ambient gas flow with at least one main air compressor;

delivering at least a first portion of the compressed ambient gas flow, with a master compressed ambient gas flow rate, to the master turbine combustor that is fluidly connected to the at least one main air compressor;

providing a master extraction conduit that is fluidly connected to a master turbine compressor;

venting the at least one master train by opening a master vent, wherein the master vent comprises at least one of the master extraction conduit or a master exhaust port, wherein the master exhaust port is fluidly connected to a master recirculation loop rotating a master turbine shaft connecting a master turbine to the master turbine compressor at an ignition speed;

delivering a master fuel stream, having a master fuel stream flow rate, to the master turbine combustor for mixing with the at least a first portion of the compressed ambient gas flow from the at least one main air compressor and with at least a first portion of a master recirculated gas flow from the master turbine compressor to form a master combustible mixture;

burning the master combustible mixture in the master turbine combustor and thereby forming the master recirculated gas flow and driving the master turbine and the master turbine compressor;

recirculating the master recirculated gas flow from the master turbine to the master turbine compressor using the master recirculation loop;

operating the master turbine at a master target operating speed, and, if necessary, accelerating the master turbine to the master target operating speed by adjusting the master fuel stream flow rate and the master compressed ambient gas flow rate;

adjusting the master fuel stream flow rate and the master compressed ambient gas flow rate to reach substantially stoichiometric combustion; and extracting at least a second portion of the master recirculated gas flow using the master extraction conduit.

10. The method of claim 9, further comprising the step of synchronizing a master turbine generator, mechanically connected to the master turbine shaft, to a power grid.

11. The method of claim 10, further comprising the step of loading the master turbine generator to a load point by increasing the master fuel stream flow rate and the master compressed ambient gas flow rate.

12. The method of claim 9, further comprising the step of purging the at least one master train before the step of delivering the master fuel stream to the master turbine combustor, wherein the master turbine shaft is rotated by external mechanical power and the at least a first portion of compressed ambient gas flow is used to vent substantially all combustibles from the at least one master train.

13. The method of claim 9, further comprising delivering a master secondary flow through a master secondary flow path, wherein the master secondary flow path delivers at least a third portion of the master recirculated gas flow from the master turbine compressor to the master turbine for cooling and sealing the master turbine and thereafter into the master recirculation loop.

14. The method of claim 9, wherein one or more of the steps are performed simultaneously.

15. The method of claim 9, wherein the step of accelerating the master turbine shaft to a target operating speed further comprises adjusting a master variable bleed valve that is in fluid communication with the main air compressor and that is configured to vent a portion, if any, of the compressed ambient gas flow to the atmosphere.

16. The method of claim 9, further comprising starting-up at least one slave train of a stoichiometric exhaust gas recirculation power plant arrangement, comprising the steps of:

delivering at least a second portion of the compressed ambient gas flow, with a slave compressed ambient gas flow rate, to the slave turbine combustor that is fluidly connected to the at least one main air compressor;

venting the at least one slave train by opening a slave vent, wherein the slave vent comprises at least one of the slave extraction conduit or a slave exhaust port, wherein the slave exhaust port is fluidly connected to a slave recirculation loop;

rotating a slave turbine shaft connecting a slave turbine to the slave turbine compressor at an ignition speed;

delivering a slave fuel stream, having a slave fuel stream flow rate, to the slave turbine combustor for mixing with the at least a second portion of the compressed ambient gas flow from the at least one main air compressor and with at least a first portion of a slave recirculated gas flow from the slave turbine compressor to form a slave combustible mixture;

burning the slave combustible mixture in the slave turbine combustor and thereby forming the slave recirculated gas flow and driving the slave turbine and the slave turbine compressor;

recirculating the slave recirculated gas flow from the slave turbine to the slave turbine compressor using the slave recirculation loop;

operating the slave turbine at a slave target operating speed, and, if necessary, accelerating the slave turbine to the slave target operating speed by adjusting the slave fuel stream flow rate and the slave compressed ambient gas flow rate;

adjusting the slave fuel stream flow rate and the slave compressed ambient gas flow rate to reach substantially stoichiometric combustion; and extracting at least a second portion of the slave recirculated gas flow using the slave extraction conduit.

17. The method of claim 16, further comprising the step of synchronizing a slave turbine generator, mechanically connected to the slave turbine shaft, to a power grid.

18. The method of claim 17, further comprising the step of loading the slave turbine generator to a load point by increasing the slave fuel stream flow rate and the slave compressed ambient gas flow rate.

19. The method of claim 16, further comprising the step of purging the at least one slave train before the step of delivering the slave fuel stream to the slave turbine combustor, wherein the slave turbine shaft is rotated by external mechanical power and the at least a second portion of compressed ambient gas flow is used to vent substantially all combustibles from the at least one slave train.

20. The method of claim 16, further comprising delivering a slave secondary flow through a slave secondary flow path, wherein the slave secondary flow path delivers at least a third portion of the slave recirculated gas flow from the slave turbine compressor to the slave turbine for cooling and sealing the slave turbine and thereafter into the slave recirculation loop.

\* \* \* \* \*